(12) United States Patent
Budmiger (10) Patent No.: US 6,539,811 B2
(45) Date of Patent: Apr. 1, 2003

(54) APPARATUS FOR MEASURING THE FLOW OF A MEDIUM TO BE MEASURED THROUGH A MEASURING TUBE

(76) Inventor: Thomas Budmiger, Oberwiler Strasse 27, CH-4107 Ettingen (CH)

( * ) Notice: Subject to any disclaimer, the term of this patent is extended or adjusted under 35 U.S.C. 154(b) by 0 days.

(21) Appl. No.: 09/737,002

(22) Filed: Dec. 14, 2000

(65) Prior Publication Data

US 2001/0013255 A1 Aug. 16, 2001

Related U.S. Application Data (60) Provisional application No. 60/179,630, filed on Feb. 1, 2000.

(30) Foreign Application Priority Data

Dec. 15, 1999 (EP) .............................................. 99124977

(51) Int. Cl.$^7$ ................................................. G01F 1/58
(52) U.S. Cl. .................................................... 73/861.15
(58) Field of Search ....................... 73/861.11, 861.12, 73/861.15, 861.14, 861.13

(56) References Cited

U.S. PATENT DOCUMENTS

| | | | |
|---|---|---|---|
| 3,942,377 A | | 3/1976 | Ginzburg et al. ......... 73/861.15 |
| 5,301,556 A | * | 4/1994 | Nissen et al. ............ 73/861.15 |
| 5,375,475 A | * | 12/1994 | Kiene et al. ............. 73/861.12 |
| 5,402,685 A | | 4/1995 | Brobeil .................... 73/861.12 |
| 5,499,543 A | | 3/1996 | Nissen et al. ............ 73/861.16 |
| 5,503,027 A | | 4/1996 | Hemp ..................... 73/861.12 |

FOREIGN PATENT DOCUMENTS

| | | |
|---|---|---|
| DE | 91 03 046.3 | 7/1991 |
| DE | 196 37 716 | 4/1998 |
| EP | 0 548 439 | 6/1993 |

* cited by examiner

Primary Examiner—Harshad Patel
(74) Attorney, Agent, or Firm—Bose McKinney & Evans LLP (57) ABSTRACT

The invention relates to an apparatus for measuring the flow of a medium (11) to be measured which flows through a measuring tube (2) in the direction of the measuring tube axis (3), having a magnetic arrangement which generates a magnetic field which permeates the measuring tube (2) and runs essentially transversely with respect to the measuring tube axis (3), having at least one measuring electrode (4; 5) which is arranged in a lateral region of the measuring tube (2) and is coupled electrically or capacitively to the medium (11) to be measured, and having an evaluation/control unit (8) which, using the measurement voltage induced in the measuring electrode (4; 5), yields information about the volumetric flow of the medium (11) to be measured in the measuring tube (2).

34 Claims, 5 Drawing Sheets

APPARATUS FOR MEASURING THE FLOW OF A MEDIUM TO BE MEASURED THROUGH A MEASURING TUBE

This application claims the benefit of Ser. No. 60/179,630, filed Feb. 1, 2000.

The invention relates to an apparatus for measuring the flow of a medium to be measured which flows through a measuring tube in the direction of the measuring tube axis, having a magnetic arrangement which generates a magnetic field which permeates the measuring tube and runs essentially transversely with respect to the measuring tube axis, having at least one measuring electrode which is arranged in a lateral region of the measuring tube and is coupled electrically or capacitively to the medium to be measured, and having an evaluation/control unit which, using the measurement voltage induced in the measuring electrode, provides information about the volumetric flow of the medium to be measured in the measuring tube.

Electromagnetic flowmeters utilize the principle of electrodynamic induction for volumetric flow measurement: charge carriers of the medium to be measured which are moved perpendicularly to a magnetic field induce a voltage in measuring electrodes which are likewise arranged essentially perpendicularly to the flow direction of the medium to be measured. This induced voltage is proportional to the flow velocity of the medium to be measured averaged over the cross section of the tube; it is thus proportional to the volumetric flow.

Considerable measurement errors can occur if the measuring tube is not filled completely but only partially with the medium to be measured, yet the measuring apparatus bases the measuring results that are yielded by it on a completely filled measuring tube. In order to eliminate this source of errors, apparatuses have already been disclosed which enable the information about the respective degree of filling of the measuring tube to be taken into account in the determination of the volumetric flow. Thus, German utility model G 91 03 046.3 has described a electromagnetic flow-measuring apparatus in which two electromagnetics are optionally excited in each case individually or jointly and where the joint excitation may optionally involve excitation in the same sense or excitation in opposite senses. In order to determine the volumetric flow, use is made of at least two voltage values which are tapped off by a corresponding pair of measuring electrodes and have been measured for different excitation states of the electromagnetic arrangement, for example excitation of the two electromagnets in the same sense and in opposite senses. An evaluation unit subsequently processes the measuring signals by means of parameters that are determined empirically to form a flow rate output signal, in the case of which the errors on account of partial filling of the measuring tube are eliminated. In order to ensure that even when the degree of filling of the measuring tube is extremely low, at least one pair of electrodes is electrically coupled to the medium to be measured and can be used for providing the measurement signal, the flow-measuring apparatus described in G 91 03 046.3 has two pairs of measuring electrodes arranged one above the other in the lower region of the measuring-tube cross section.

Furthermore, the prior art has disclosed the provision, in addition to two measuring electrodes arranged in the central region of the measuring tube, in each case of a test electrode in the upper region and a further test electrode in the lower region of the measuring tube, the lower test electrode usually being grounded. While the voltage measured at the test electrodes serves for identifying the degree of filling of the measuring tube, the desired information about the volumetric flow through the measuring tube can be obtained from the voltage values measured at the measuring electrodes.

In order that the known apparatus for determining the degree of filling of the measuring tube can be used as universally as possible; the source resistance of the test voltage applied to the test electrodes must be relatively high (e.g. of the order of magnitude of 100 k$\Omega$). It is only in this way that the apparatus for determining the volumetric flow can be used universally for the large range of media to be measured which have to be covered and, as is known, can differ quite considerably from one another in respect of their electrical conductivity.

The disadvantage of the known solution is manifested when, instead of a compact device in which the actual sensor and the electronic section are accommodated in a housing, a measuring device is used in which the sensor is arranged in the process and is connected to remote conversion electronics via a connecting line, usually a coaxial cable. This connecting line brings about voltage division dependent on the length of the coaxial cable, where a measurable voltage component is no longer available at all at the test electrode when the connecting line is more than a certain length. Consequently, the known measuring apparatus for identifying the degree of filling of the measuring tube is restricted to certain applications—namely to use in compact devices or in devices in which the connecting line between the sensor and the remote electronic unit does not exceed approximately 10 m.

The invention is based on the object of proposing a universally usable and cost-effective apparatus for measuring the volumetric flow and/or for identifying the degree of filling of a measuring tube.

The object is achieved by virtue of the fact that at least one test electrode is provided in the upper region of the measuring tube, that the evaluation/control unit passes a test signal to the test electrode and that the evaluation/control unit uses the response signal to the test signal, said response signal being received by the measuring electrode, to provide information about the degree of filling of the measuring tube. According to the invention, the so-called "empty tube detection", that is to say the identification of whether the measuring tube is completely filled or only partially filled or entirely empty, is effected by the application of a test signal to the test electrode. If the measuring tube is filled, then said test signal is manifested as a response signal at the measuring electrode. If, on the other hand, the measuring tube is only partially filled or if it is empty, then there is no electrical connection, or there is a disturbed electrical connection, between the top test electrode and the measuring electrode. Consequently, no response signal or else an attenuated response signal appears at the measuring electrode.

Although, in principle, one measuring electrode is sufficient for determining the volumetric flow and for identifying the "empty tube detection", an advantageous embodiment of the apparatus according to the invention provides a second measuring electrode, which is arranged in the region of the measuring tube opposite the first measuring electrode. The two measuring electrodes are preferably diametrically opposite one another in the central region of the measuring tube.

In order to utilize conditions of symmetry and redundant measurement that is enabled as a result of this, the test electrode is arranged with respect to the two measuring electrodes in such a way that it is essentially at the same distance from each of the two measuring electrodes. A test signal output by the test electrode thus generates an essentially identical response signal at each of the two measuring electrodes. If serious differences occur in this case, then this indicates, under certain circumstances, a malfunction, e.g. of one of the measuring electrodes.

An advantageous development of the apparatus according to the invention provides a second test electrode, which is essentially diametrically opposite the first test electrode, the first test electrode preferably being arranged in the topmost point of the measuring tube and the second test electrode in the bottommost point of the measuring tube. One refinement of the apparatus according to the invention proposes that one of the two test electrodes is grounded. The grounded test electrode is preferably the electrode which is arranged in the lower region of the measuring tube. As already indicated above, the second test electrode used as a reference electrode is not absolutely necessary. Grounding disks may also serve as reference potential, said disks being provided for example on the flanges for fixing the flow-metering apparatus in a tube system.

A preferred development of the apparatus according to the invention suggests that the test signal be a symmetrical pulse. This embodiment has the following advantage over an arbitrary non-symmetrical test signal: the relatively high energy density of the test signal can lead to a shift in the electrochemical potentials within the medium to be measured. If the test signal is designed as a symmetrical pulse, then the potential shifts average out approximately to zero.

A preferred embodiment of the apparatus according to the invention provides for the evaluation/control unit to correlate the response signals at the test electrode and the measuring electrode/the measuring electrodes with the test signal. This is a simple and reliable method for identifying whether or not the response signal to the test signal appears at the measuring electrode/at the measuring electrodes.

Furthermore, an advantageous development of the apparatus according to the invention provides for the evaluation/control unit to determine the information about the degree of filling by comparing the response signals measured at the test electrode and/or at the measuring electrode/the measuring electrodes with predetermined reference signals. These reference signals are determined beforehand in a separate measuring process under the respectively prevailing process and system conditions. The tolerances can thereby be designed in an apparatus-related manner and, consequently, such that they are relatively small, as a result of which the quality of the measurements can be improved and reliable identification of an incompletely filled measuring tube can thus be achieved.

A preferred development of the apparatus according to the invention proposes a storage unit, in which the predetermined reference signals are stored.

The invention is explained in more detail with reference to the following drawings, in which.

Figure 1A:
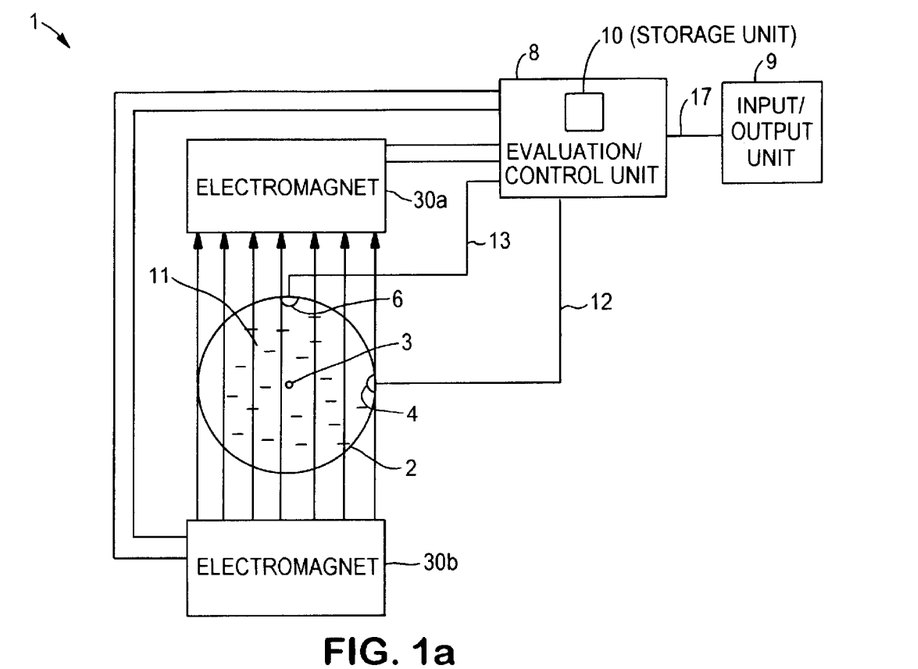
FIG. 1a shows a diagrammatic illustration of a first embodiment of the apparatus according to the invention with a measuring tube completely filled with a medium.
Figure 1B:
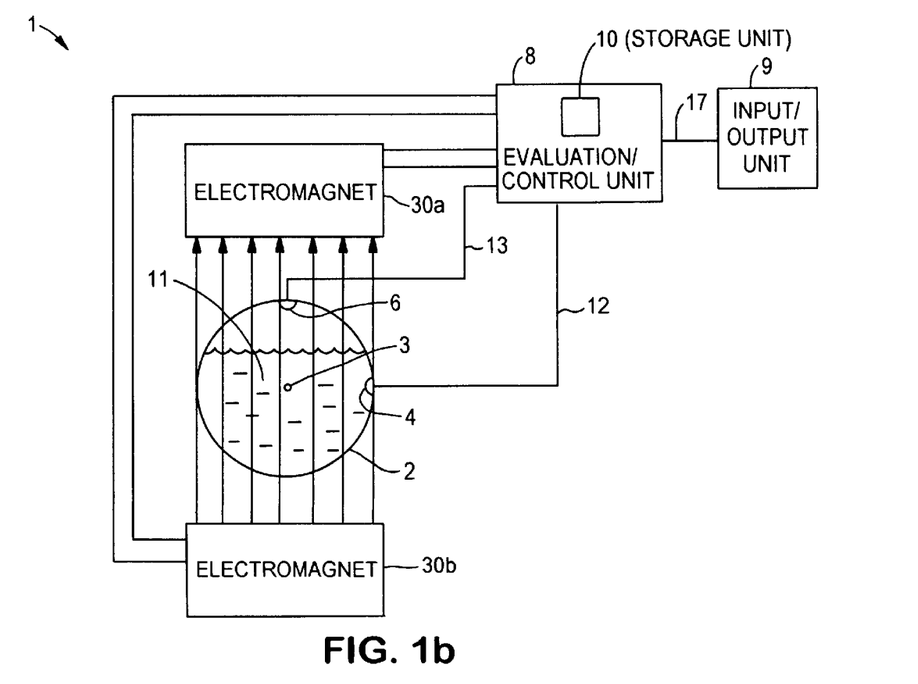
FIG. 1b shows a diagrammatic illustration of the first embodiment of the apparatus according to the invention with the measuring tube partially filled with a medium.
Figure 2A:
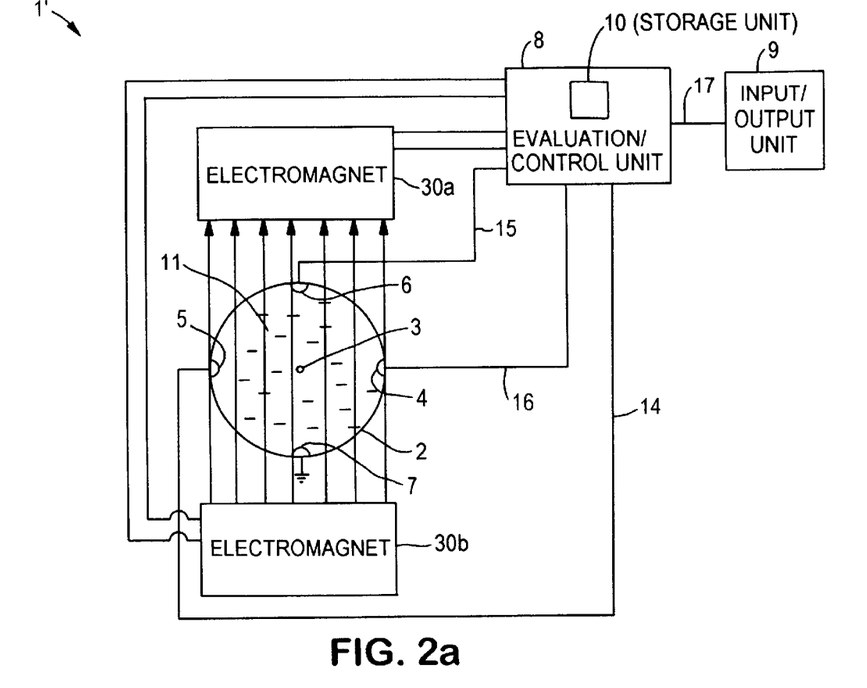
FIG. 2a shows a diagrammatic illustration of the second embodiment of the apparatus according to the invention with a measuring tube completely filled with a medium.
Figure 2B:
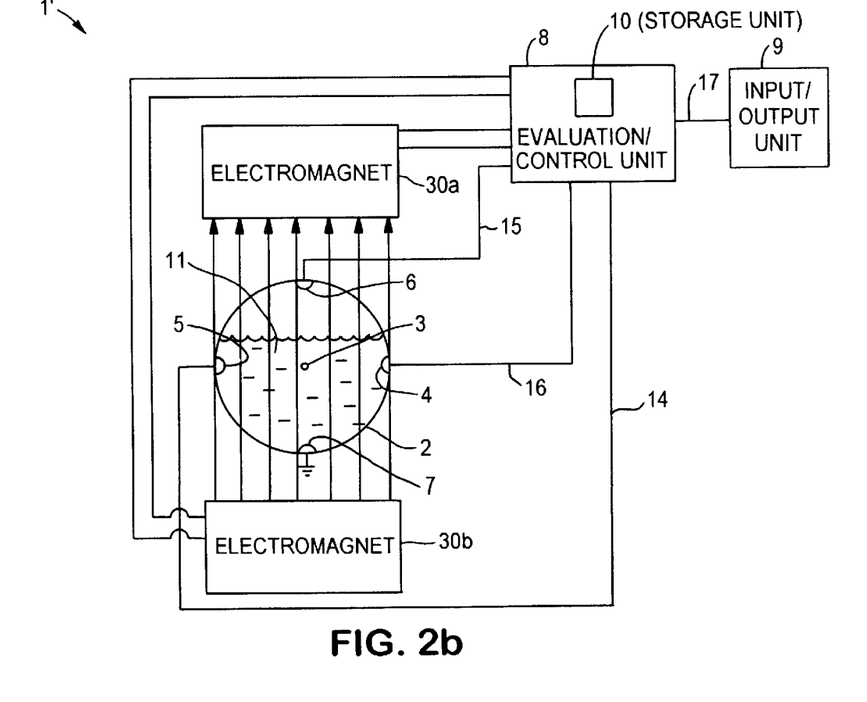
FIG. 2b shows a diagrammatic illustration of the second embodiment of the apparatus according to the invention with the measuring tube partially filled with a medium.
Figure 5:
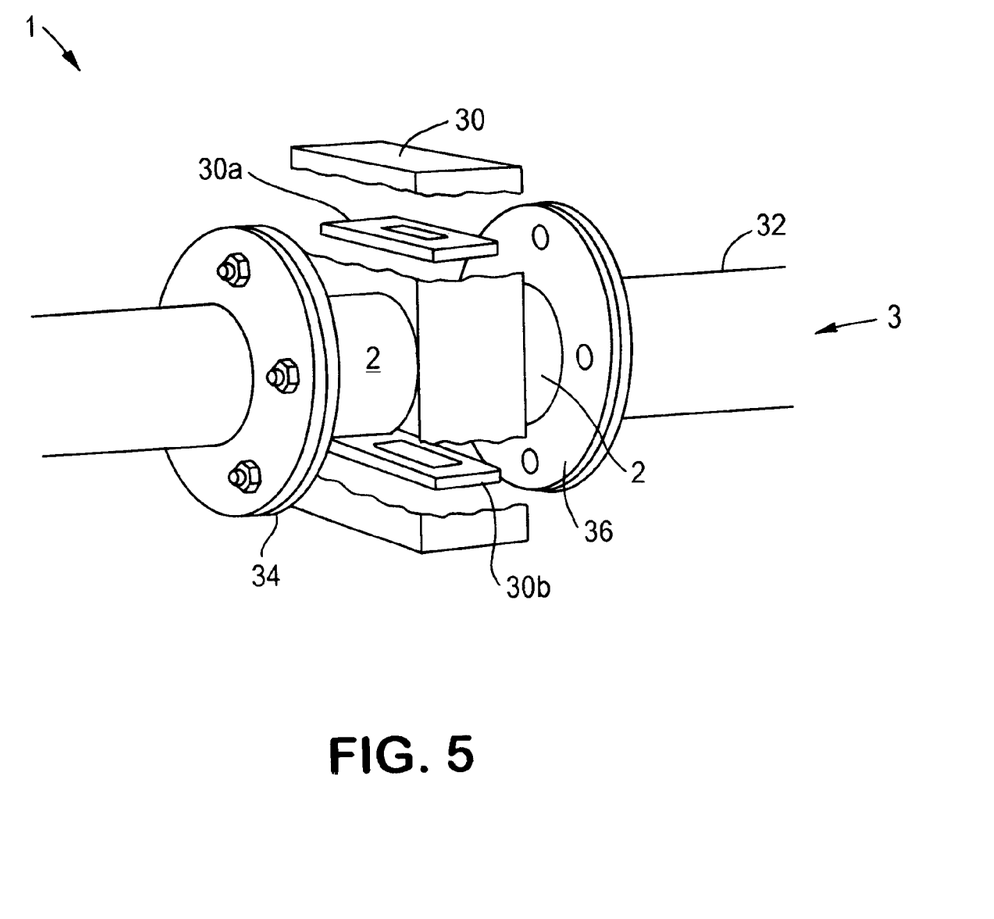
FIG. 5 shows connection of an apparatus according to the present invention to a tube system for measuring a flow of an electrically conductive medium.

FIG. 5 shows connection of an apparatus 1,1' according to the present invention to a tube system 32 for measuring a flow of an electrically conductive medium 11 (shown in FIGS. 1a, 1b, 2a and 2b). As illustrated, the apparatus 1,1' includes a measuring tube 2 and a magnetic arrangement 30. The magnetic arrangement 30 includes two electromagnets 30a and 30b which are discussed in further detail below in connection with FIGS. 1a–1b and 2a–2b. The measuring tube 2 is connected to the tube system 32 through which the medium 11 to be measured flows. In the exemplary embodiments, the measuring tube 2 has a central axis 3 and is connected via connecting elements 34, 36, e.g. flanges, to the tube system 32 such that the medium 11 to be measured flows through the measuring tube 2 along the central axis 3 of the measuring tube 2.;

FIGS. 1a and 1b shows diagrammatic illustrations of a first embodiment of the apparatus 1 according to the invention, with a measuring tube that is completely filled (FIG. 1a) and not completely filled (FIG. 1b), respectively. FIGS. 2a and 2b show diagrammatic illustrations of a second embodiment, apparatus 1 according to the invention, with a measuring tube that is completely filled (FIG. 2a) and not completely filled (FIG. 2b), respectively. The main difference between the two embodiments is that just one measuring electrode 4 and one test electrode 6 are provided in the the embodiment shown in FIGS. 1a and 1b whereas two measuring electrodes 4, 5 and two test electrodes 6, 7 are provided in the the second embodiment shown in FIGS. 2a and 2b. It should be readily appreciated that flow connection of the apparatus 1' is made in a generally like manner to that of apparatus 1 (discussed above in connection with FIG.5).

In the two embodiments shown in FIGS. 1a–1b, and 2a–2b, a medium 11 to be measured flows through the measuring tube 2 of a flowmeter in the direction of the measuring tube axis measuring electrode 3 and measuring electrodes 4, 5. The medium 11 to be measured is electrically conductive at least to a slight extent. The measuring tube 2 itself is produced from a non-conductive material, or at least its inside is lined with a non-conductive material.

On account of a magnetic field which is oriented perpendicularly to the flow direction of the medium 11 to be measured and is usually generated by two diametrically arranged electromagnets, 30a and 30b (see also FIG. 5), charge carriers located in the medium 11 to be measured migrate to the measuring electrode 4 or 4, 5 of opposite plurality. The voltage which builds up across the measuring electrode 4 or across the measuring electrodes 4, 5 is proportional to the flow velocity, averaged over the cross section of the measuring tube 2, of the medium 11 to be measured, that is to say it is a measure of the volumetric flow of the medium 11 to be measured in the measuring tube 2. In the two cases shown, the measuring electrode 4 and measuring electrodes 4, 5 are in direct contact with the medium to be measured; however, as already mentioned above, the coupling may also be of a capacitive nature.

The measuring electrodes 4, 5 and the test electrodes 6, 7 are connected to the evaluation/control unit 8 via connecting lines 12, 13 or 14, 15, 16.

Said evaluation/control unit 8 connected to an input/output 9 unit via a connecting line 17. The evaluation/ control unit 8 of the exemplary embodiments shown in FIGS. 1*a*–1*b* and 2*a*–2*b* includes a storage unit 10.

Figure 4A:
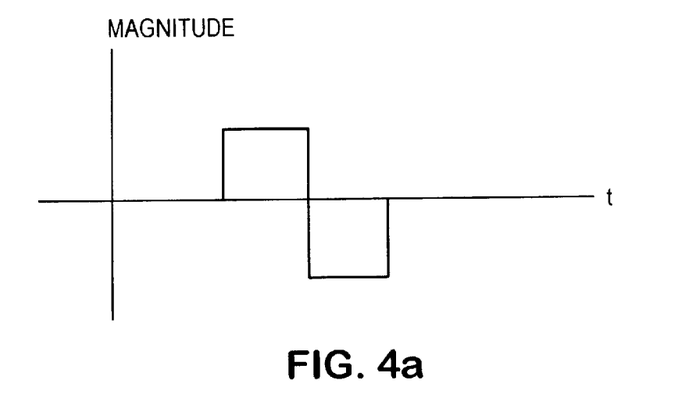
FIGS. 4a, 4b, and 4c show exemplary symmetrical test pulses used by the first and second embodiments of the apparatus according to the invention.
Figure 4B:
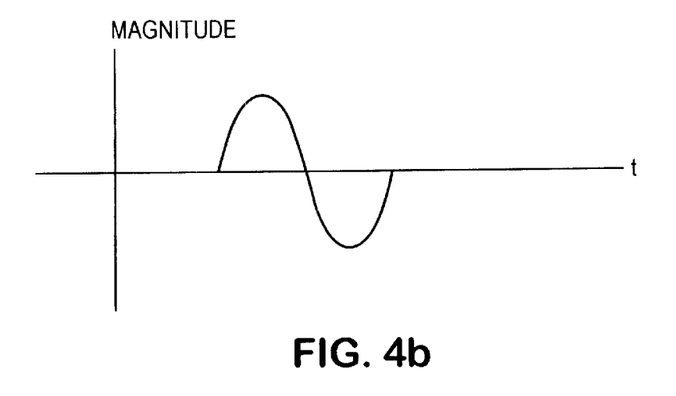
Figure 4C:
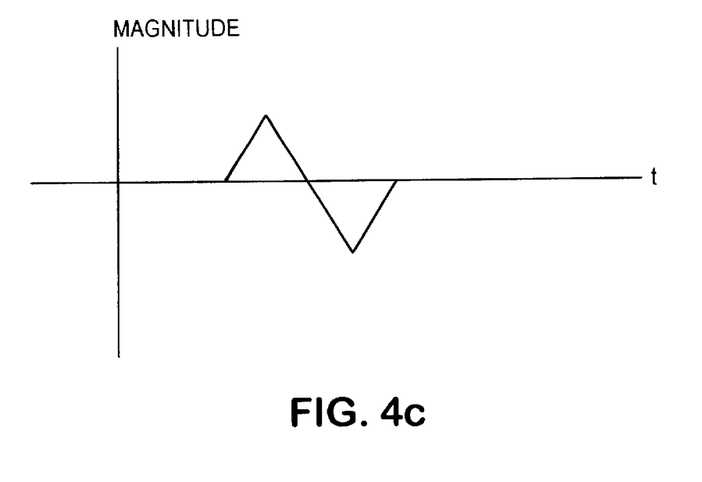

The apparatus 1 or apparatus 1' according to the invention preferably operates as follows: the evaluation/control unit 8 passes a test signal to the test electrode 6 at predetermined time intervals $t_M$. The test signal is preferably a symmetrical pulse. As already explained above, potential fluctuations induced in the medium 11 to be measured are averaged at least approximately to zero when a symmetrically constructed test signal is applied. The volumetric flow measurement is thus disturbed hardly at all by the superposed process for identifying the degree of filling of the measuring tube 2. FIGS. 4*a*, 4*b*, and 4*c* depict a few exemplary symmetrically test pulses which may be used by the first and second exemplary apparatus 1,1'. However, the present invention is not limited to the pulses depicted in FIGS. 4*a*–4*c*, and it should be readily appreciated that in alternative embodiments, the evaluation/control unit 8 may be suitably configured to provide any number of a plurality of symmetrical pulses in any number of ways which are well known.

The test signal passed to the test electrode 6 appears as a response signal at the measuring electrode 4 or at the measuring electrodes 4, 5 if the medium 11 to be measured is situated between the test electrode 6 and the measuring electrode 4 or the measuring electrodes 4, 5. The evaluation/control unit 8 preferably determines the response signal by carrying out a correlation between the test signal and the response signal at the respective measuring electrode 4, 5.

Both the medium 11 to be measured and the other external system and process conditions greatly influence the reliability with which the apparatus 1 according to the invention ultimately operates for the purpose of determining the volumetric flow. Therefore, a defined test signal is passed to the test electrode 6 under defined system and process conditions, e.g. with a completely filled measuring tube 2. The corresponding response signal is respectively determined at the measuring electrode 4 or at the measuring electrodes 4, 5. The measured response signal is stored as a reference response signal or as a desired response signal in the storage unit 10. All actual response signals that are subsequently determined are compared with this reference response signal. If the actual response signals lie within predetermined tolerances Δ around the desired response signal, then this is an indication that the measurement of the mass rate of flow is being carried out with a completely filled measuring tube 2. If, on the other hand, the actual response signal lies outside the predetermined tolerances Δ around the desired response signal, then the evaluation/control unit 8 notifies the operating personnel, e.g. via the input/output unit, that the measuring tube 2 is not completely filled.

Figure 3:
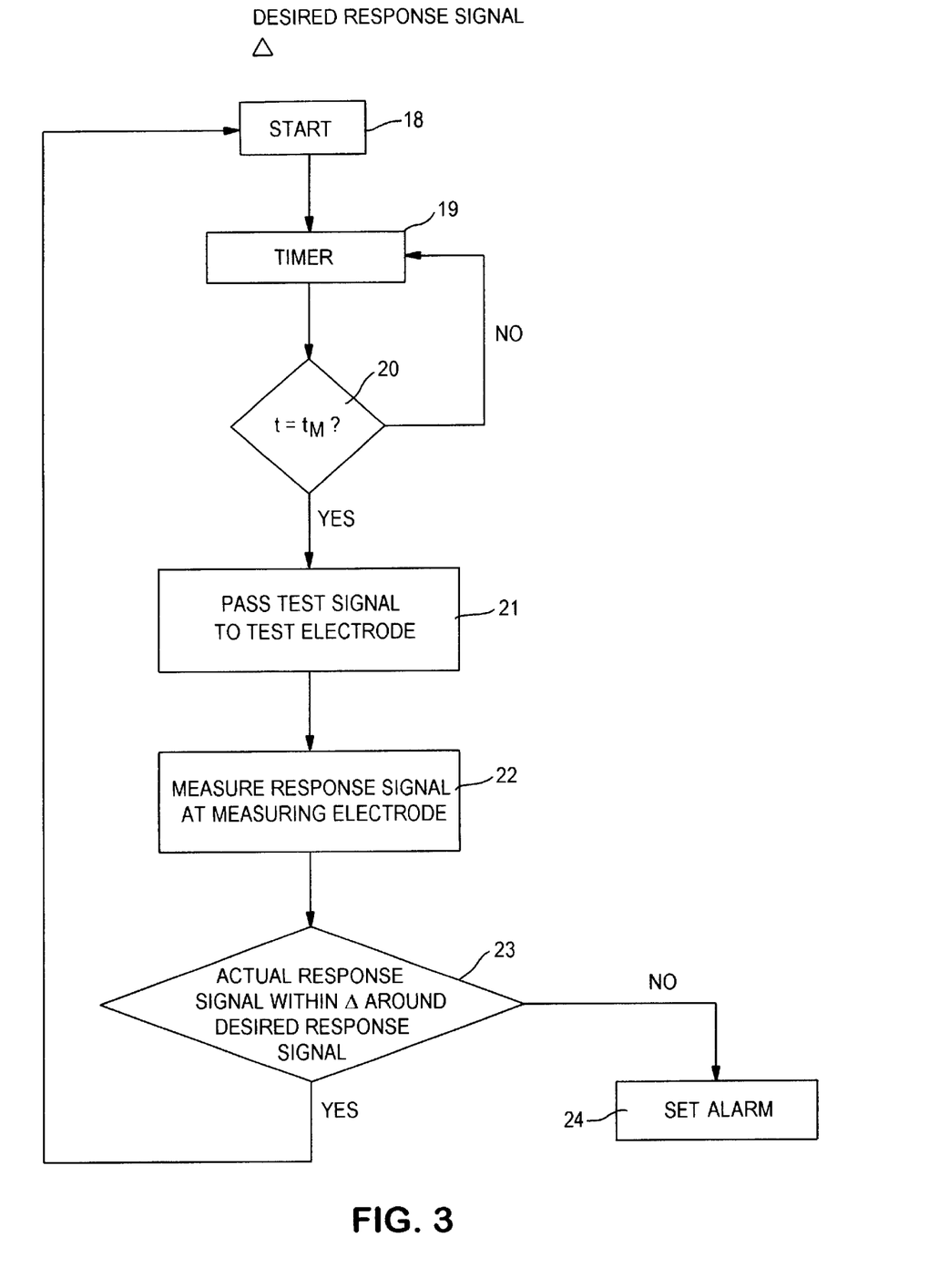
FIG. 3 shows a flow diagram relating to the driving of the evaluation/control unit.

FIG. 3 illustrates a flow diagram relating to the driving of the evaluation/control unit 8. As already stated, under predetermined system and process conditions at the beginning of the actual pick-up of measured values, a test signal is passed to the test electrode 6 and the corresponding response signal at the measuring electrode 4 or the corresponding response signals at the measuring electrodes 4, 5 is or are stored as the desired response signal or as the desired response signals. Furthermore, tolerances Δ are prescribed for the response signal or the response signals. The reference response signals are preferably determined with a measuring tube 2 that is completely filled with the medium 11 to be measured.

At program point 18, the measurement/evaluation process is started. By means of a timer (program point 19) and a time interrogation (program point 20), after a predetermined time $t_M$ the defined test signal is passed to the test electrode 6 at program point 21. The response signal is measured at at least one measuring electrode 4; 5 at program point 22. If the actual response signal lies within the predetermined tolerance Δ around the desired response signal, then it is rated as a desired state by the evaluation/control unit 8. The individual program points are subsequently executed repeatedly after the predetermined time $t_M$. If the measurement and evaluation at program points 22, 23 reveal that the actual response signal lies outside the predetermined tolerance Δ around the desired response signal, then the fact that the measuring tube 2 does not have the defined degree of filling of the measuring tube 2 is indicated to the operating personnel via the input/output unit 10.

What is claimed is:

1. An apparatus for measuring the flow of a medium to be measured which flows through a measuring tube in the direction of a measuring tube axis, comprising a magnetic arrangement which generates a magnetic field which permeates the measuring tube and runs essentially transversely with respect to the measuring tube axis, at least one measuring electrode which is arranged in a lateral region of the measuring tube and is coupled electrically or capacitively to the medium to be measured, and an evaluation/control unit which, using a measurement voltage induced in the at least one measuring electrode, yields information about a volumetric flow of the medium to be measured in the measuring tube, wherein at least one test electrode is provided in an upper region of the measuring tube, the evaluation/control unit passes a test signal to the at least one test electrode to produce a response signal, said response signal is received by the at least one measuring electrode when the medium is at least between the at least one measuring electrode and the at least one test electrode, and the evaluation/control unit uses the response signal to provide information about the degree of filling of the measuring tube.

2. The apparatus as claim in claim 1, wherein a second measuring electrode is provided, which is arranged in the region of the measuring tube opposite the first measuring electrode.

3. The apparatus as claimed in claim 2, wherein the two measuring electrodes are diametrically opposite one another in a central region of the measuring tube.

4. The apparatus as claim in claim 3, wherein the at least one test electrode is arranged with respect to the two measuring electrodes in such a way that it is essentially at the same distance from each of the two measuring electrodes.

5. The apparatus as claimed in claim 3, wherein the at least one test electrode includes first and second test electrodes, the measuring tube includes a topmost point and a bottommost point spaced apart from the topmost point, the second test electrode is essentially diametrically opposite the first test electrode, the first test electrode is preferably arranged in the topmost point of the measuring tube and the second test electrode is preferably arranged in the bottommost point of the measuring tube.

6. The apparatus as claimed in claim 3, wherein at least the one test electrode is grounded.

7. The apparatus as claimed in claim 3, wherein the test signal is a symmetrical pulse.

8. The apparatus as claim in claim 2, wherein the at least one test electrode is arranged with respect to the two measuring electrodes in such a way that it is essentially at the same distance from each of the two measuring electrodes.

9. The apparatus as claimed in claim 2, wherein the at least one test electrode includes first and second test electrodes, the measuring tube includes a topmost point and a bottommost point spaced apart from the topmost point, the second test electrode is essentially diametrically opposite the first test electrode, the first test electrode is preferably arranged in the topmost point of the measuring tube and the second test electrode is preferably arranged in the bottommost point of the measuring tube.

10. The apparatus as claimed in claim 2, wherein at least the one test electrode is grounded.

11. The apparatus as claimed in claim 2, wherein the test signal is a symmetrical pulse.

12. The apparatus as claimed in claim 1, wherein the at least one test electrode is substantially the same distance from each of the at least one measuring electrode.

13. The apparatus as claimed in claim 4, wherein the at least one test electrode includes first and second test electrodes, the measuring tube includes a topmost point and a bottommost point spaced apart from the topmost point, the second test electrode is essentially diametrically opposite the first test electrode, the first test electrode is preferably arranged in the topmost point of the measuring tube and the second test electrode is preferably arranged in the bottommost point of the measuring tube.

14. The apparatus as claimed in claim 4, wherein at least the one test electrode is grounded.

15. The apparatus as claimed in claim 12, wherein the test signal is a symmetrical pulse.

16. The apparatus as claimed in claim 1, wherein the at least one test electrode includes first and second test electrodes, the measuring tube includes a topmost point and a bottommost point spaced apart from the topmost point, the second test electrode is essentially diametrically opposite the first test electrode, the first test electrode is preferably arranged in the topmost point of the measuring tube and the second test electrode is preferably arranged in the bottommost point of the measuring tube.

17. The apparatus as claimed in claim 5, wherein one of the first and second test electrodes is grounded.

18. The apparatus as claimed in claim 16, wherein the test signal is a symmetrical pulse.

19. The apparatus as claimed in claim 1, wherein at least one test electrode is grounded.

20. The apparatus as claimed in claim 19, wherein the test signal is a symmetrical pulse.

21. The apparatus as claimed in claim 1, wherein the test signal is a symmetrical pulse.

22. The apparatus as claimed in claim 21, wherein the evaluation/control unit correlates the response signal at at least one test electrode and the at least one measuring electrode with the test signal.

23. The apparatus as claimed in claim 21, wherein the evaluation/control unit determines the information about the degree of filling of the measuring tube by comparing the response signals measured at at least one test electrode and the at least one measuring electrode with predetermined reference signals.

24. The apparatus of claim 21, wherein the evaluation/control unit correlates the response signal at at least one test electrode and the it least one measuring electrode with the test signal.

25. The apparatus of claim 21, wherein the evaluation/control unit determines the information about the degree of filling of the measuring tube by comparing the response signals measured at at least one test electrode and the at least one measuring electrode with predetermined reference signals.

26. The apparatus as claimed in claim 1, wherein the evaluation/control unit correlates the response signal at at least one test electrode and the at least one measuring electrode with the test signal.

27. The apparatus as claimed in claim 26, wherein the evaluation/control unit determines the information about the degree of filling of the measuring tube by comparing the response signals measured at one of the at least one test electrode and the at least one measuring electrode with predetermined reference signals.

28. The apparatus of claim 26, wherein the evaluation/control unit determines the information about the degree of filling of the measuring tube by comparing the response signals measured at at least one test electrode and the at least one measuring electrode with predetermined reference signals.

29. The apparatus as claimed in claim 1, wherein the evaluation/control unit determines the information about the degree of filling of the measuring tube by comparing the response signals measured at at least one test electrode and at the at least one measuring electrode with predetermined reference signals.

30. The apparatus as claimed in claim 29, wherein the predetermined reference signals are determined for a defined degree of filling of the measuring tube and as a function of the respective process-specific parameters.

31. The apparatus as claimed in claim 30, wherein a storage unit is provided, in which the predetermined reference signals are stored.

32. The apparatus as claimed in claim 29, wherein a storage unit is provided, in which the predetermined reference signals are stored.

33. The apparatus of claim 1, wherein the evaluation/control unit correlates the response signal at at least one test electrode and the at least one measuring electrode with the test signal.

34. The apparatus of claim 1, wherein the evaluation/control unit determines the information about the degree of filling of the measuring tube by comparing the response signals measured at at least one test electrode and the at least one measuring electrode with predetermined reference signals.

* * * * *

UNITED STATES PATENT AND TRADEMARK OFFICE
CERTIFICATE OF CORRECTION

PATENT NO. : 6,539,811 B2
DATED : April 1, 2003
INVENTOR(S) : Thomas Budmiger It is certified that error appears in the above-identified patent and that said Letters Patent is hereby corrected as shown below:

<u>Title page,</u>
Item [73], please add the following assignee:
-- Endress + Hauser Flowtec AG, Reinach (Switzerland) --

Signed and Sealed this

Sixth Day of July, 2004

JON W. DUDAS
*Acting Director of the United States Patent and Trademark Office*